US006898199B1

(12) United States Patent
Silva et al.

(10) Patent No.: US 6,898,199 B1
(45) Date of Patent: *May 24, 2005

(54) ARCHITECTURE FOR PROVIDING FLEXIBLE, PROGRAMMABLE SUPPLEMENTARY SERVICES IN AN EXPANDABLE TELECOMMUNICATIONS SYSTEM

(75) Inventors: Michael C. Silva, Centerville, MA (US); Mark P. Hebert, Kingston, MA (US)

(73) Assignee: Excel Switching Corporation, Hyannis, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,636

(22) Filed: Mar. 18, 1999

(51) Int. Cl.[7] .......................... H04L 12/56; H04Q 11/08
(52) U.S. Cl. ...................... 370/352; 370/392; 370/401; 370/463; 379/201.01
(58) Field of Search ................................ 370/259, 260, 370/359, 360, 386, 400, 401, 410, 903, 352, 375, 389, 392, 469; 379/201.01, 272, 230, 909, 273, 335, 90.01, 93.07

(56) References Cited

U.S. PATENT DOCUMENTS 5,544,163 A   8/1996  Madonna 5,657,451 A * 8/1997 Khello ..................... 379/201
6,058,181 A * 5/2000 Hebert ..................... 379/242
6,088,749 A * 7/2000 Hebert et al. ............. 710/105

FOREIGN PATENT DOCUMENTS

| EP | 0 849 960 | 6/1998 |
| EP | 0849960 | 6/1998 |
| WO | 9903251 | 1/1999 |
| WO | 99 03251 | 1/1999 |
| WO | 00 23898 | 4/2000 |

OTHER PUBLICATIONS

Bellcore, Generic Requirements, "Call Processing," GR–505–CORE, Issue 1, Dec., 1997.

* cited by examiner

Primary Examiner—Afsar Qureshi

(57) ABSTRACT

This invention relates to a supplementary services layer (SSL) application in the switching node for the development and execution of subscriber-based supplementary services. The SSL communicates with the L4 application through an L4–L5 interface. Therefore, a system operator may configure the switching node to execute supplementary services without intervention from a host application and without modification to the current L4 application. The SSL also communicates with the L5 application in order for that application to integrate supplementary services without further modifications. The SSL comprises a Database Interface Service, a Service Object Manager (SOM) and one or more instances of a Supplementary Service Object (SSO). The database interface service provides connection to an external database which stores each subscriber's profile. Each SSO instance implements one or more supplementary services for a call. The SOM exercises overall control over these SSO instances.

21 Claims, 5 Drawing Sheets

ARCHITECTURE FOR PROVIDING FLEXIBLE, PROGRAMMABLE SUPPLEMENTARY SERVICES IN AN EXPANDABLE TELECOMMUNICATIONS SYSTEM

CROSS-REFERENCE TO RELATED APPLICATIONS

This invention is related to the following copending U.S. Patent Applications:

U.S. Pat. No. 6,370,136 titled, DIALING PLAN ARRANGEMENT FOR EXPANDING TELECOMMUNICATIONS SYSTEM; and U.S. Pat. No. 6,526,050 titled, PROGRAMMING-CALL-PROCESSING APPLICATION IN A SWITCHING SYSTEM, each of which was filed on even date herewith and assigned to the assignee of the present invention.

TECHNICAL FIELD

The invention relates generally to the field of telecommunications switching systems and more particularly to a software application in a switching node that enables the switching node to implement subscriber-based services without supervision from a host application.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switching node also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards. In order to perform switching on calls, the switching node receives information from and transmits information to line card ports over the system buses at predetermined times known as time slots. Each time slot generally corresponds with a port on the switch. The time slots associated with each port and the software applications that manage calls on those time slots are generally termed "channels".

Each call involves connection between two ports. Because communication between these ports is bi-directional, it thus requires four time slots on the system buses. One time slot is used for transmission from one port to the matrix card, a second time slot is used for retrieving information from matrix card and sending it to the other port; the other two time slots are used for transmissions in the other direction.

The telecommunications system also includes a host, i.e., a group of software applications that typically reside on a computer dedicated to those applications. The switching nodes on the system are interconnected by an internodal switching network. A second network termed the "host network," interconnects the switching nodes and the host computer for supervisory control. The host, the switching nodes and the line cards each includes a software protocol application that processes calls at its level of the system. Specifically, a Layer 5 (L5) protocol application in the host manages calls at the host level; a Layer 4 protocol application (L4) in the switch manages calls at the switch level; and Layer 3 (L3) protocol applications in the line cards handle calls at the line card level of the system.

Traditionally, the L5 application in the host also managed the L4 functions in the switch. All requests from the L3 application to the L4 application were transmitted to the L5 application and the L5 application instructed the L4 application on how the handle each request. Since the L5 application was involved in directing nearly all real-time call processing on the switch, the message traffic between the switch and the host was high and this sometimes delayed the transmission of messages between the host and the switch. Moreover, if the host-to-switch link failed or if the host failed, the switch was basically rendered inoperable.

This problem was largely resolved by expanding the L4 application in the switch to provide functions previously performed exclusively in the L5 application. The expanded L4 application is a open and programmable layer that provides services such as, channel management, connection management, tone and announcement services and conference services. Channel management enables the L4 application to recognize incoming calls, answer calls, and release calls; connection management provides the ability to disconnect two channels, tone and announcement services provide the ability to play and receive tones and play announcements; and conference services provide the ability to connect multiple parties during a call. With the expanded L4 application, a system owner/operator might expand predefined L4 call management operations to accommodate unique call processing requirements. Thus, host applications may be simplified, or in some cases totally eliminated.

Each call on a time slot is associated with a subscriber profile which identifies the supplementary services available to that call. Examples of supplementary services include call waiting, call forwarding and conference calling among others. Applications that process these supplementary services reside in the host. Thus, when a call is received on one time slot from the L3 application, the L4 application transmits a request to the L5 application in order to identify the appropriate subscriber profile and supplementary services for that call. The L5 application locates the subscriber profile associated with the call, controls the supplementary services identified in the subscriber profile and returns the appropriate results to the L4 application. The L4 application then performs switching functions on the call. Since the switch still relies on the host to identify and process supplementary services, a host failure prevents the switching node from properly processing calls with supplementary services.

Moreover, when a supplementary service is added or modified, the L5 application must be updated. This increases the risk of introducing errors to the L5 application which may adversely affect the processing of supplementary services or other L5 functions.

SUMMARY OF THE INVENTION

We have created a supplementary services layer (SSL) application in the switching node for the development and execution of subscriber-based supplementary services. The SSL communicates with the L4 application through an L4–L5 interface in order for the SSL to obtain access to services offered by the L4 application. Therefore, a system operator may configure the switching node to execute supplementary services without intervention from a host application and without modification of the current L4 application. The SSL also communicates with the L5 application in order for that application to integrate supplementary services without further modifications. With this arrangement, the supplementary services functions are separated from the L5 application and transferred to the switching node. This makes it easier for the system owner to add or modify supplementary services.

Specifically in the preferred embodiment of the invention, the SSL comprises a. Database Interface service, a Service Object Manager (SOM) and one or more instance of a Supplementary Service Object (SSO). The database interface service provides connection to an external database which stores each subscriber's services profile. Each SSO instance implements one or more supplementary services for a call. The SOM exercises overall control over these SSO instances. It allocates, de-allocates, initializes, addresses, and supports SSO instances. Each SSO instance further comprises a Service Control object (SC), one or more Service Element objects (SE), an Associate Party Manager object (APM), Support Services objects, and Control Services objects.

The SC activates the other objects in an SSO instance on a per-need basis. It also prioritizes these objects and manages interaction between them. The SC is the only object that interfaces with the L4 application; it has access to all of the L4 services and thus, it passes requests from other objects to the L4 application. Each SE object implements a single supplementary service and the SE objects are loosely coupled through the SC. Each SE object defines an interface with the SC for instructing the SC on how to implement a supplementary service. An instance of the SE object is created when it is needed to perform a task and it is de-allocated when the task is completed. The APM serves an interface object to other SSO instances.

The SC, SE, and APM each has its own support services. These support services provide the functionality needed to perform each task. An example of a support service is a software object that provides access to an external application. The SE and APM objects also have control services that implement control models for allocating, de-allocating and addressing these SE and APM objects. These control services directly manage multiple instances of the SE and APM state machines and the control services are indirectly accessed by the SC.

The SSL implements both subscriber and PSTN call models. If a call is from a subscriber, the SOM creates a subscriber SSO instance and it obtains the list of supplementary services for that subscriber from the external database. If the call is from the PSTN, the SOM creates a PSTN SSO instance and it obtains the profile for the PSTN subscriber from local sources.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
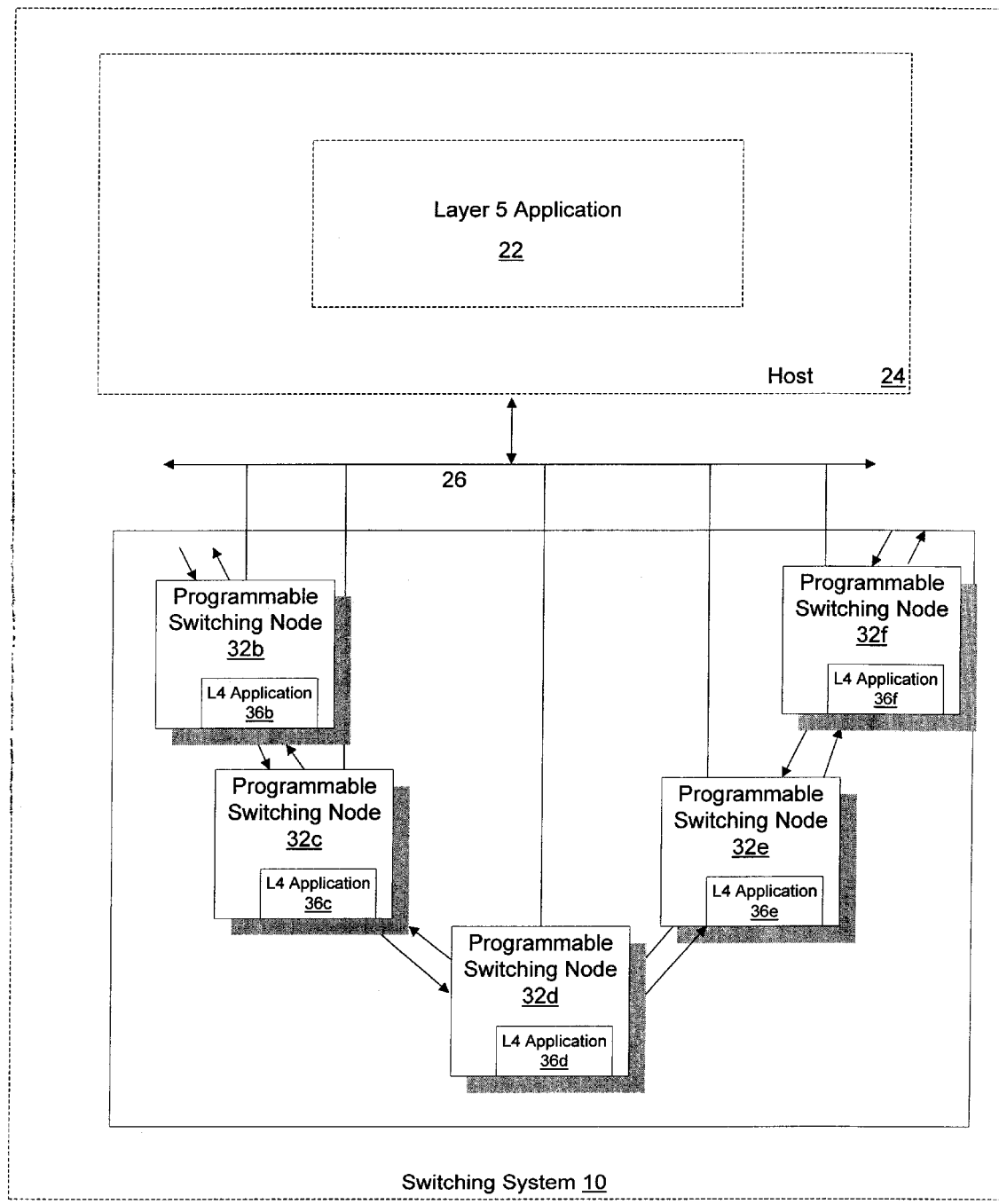
FIG. 1 is a diagram of a call switching system incorporating the invention.

The communications network in FIG. 1 is configured to process calls to, from and within a switching system 10. The switching system 10 includes switching nodes 32b–32f that are connected by a ring-like internodal switching network 34 to pass among them the various messages handled by the switching system 10. Each switching node 32b–32f is associated with a plurality of network/line interfaces (not shown) which provide connections between the switching system 10 and subscribers' lines, for example, and also with other switching systems such as the PSTN. These interfaces also provide access to system resources such as DSP resources and voice-mail functions. The communications network also includes a host computer 24 that runs a protocol application 22. The host computer 24 is linked to the switching nodes 32b–32f by a host network 26.

The host computer 24, the switching nodes 32b–32f and the line cards (not shown) include software applications which process calls in these layers. A Layer 5 (L5) protocol application 22 in the host 24 manages calls at the host level; a Layer 4 (L4) protocol application 36b–36f in each switching node 32b–32f manages calls at the switching node level; and a Layer 3 (L3) protocol application in each line cards manages calls at the line card level. In the present invention, Supplementary services layer (SSL) applications for executing supplementary services were also included in each switching node 32b–32f. Examples of supplementary services include call waiting, call forwarding, and caller identification, among others. The SSL enables the system operator/owner to develop and execute subscriber-based supplementary services in each switching node 32b–32f without intervention from a host application 22.

Figure 2:
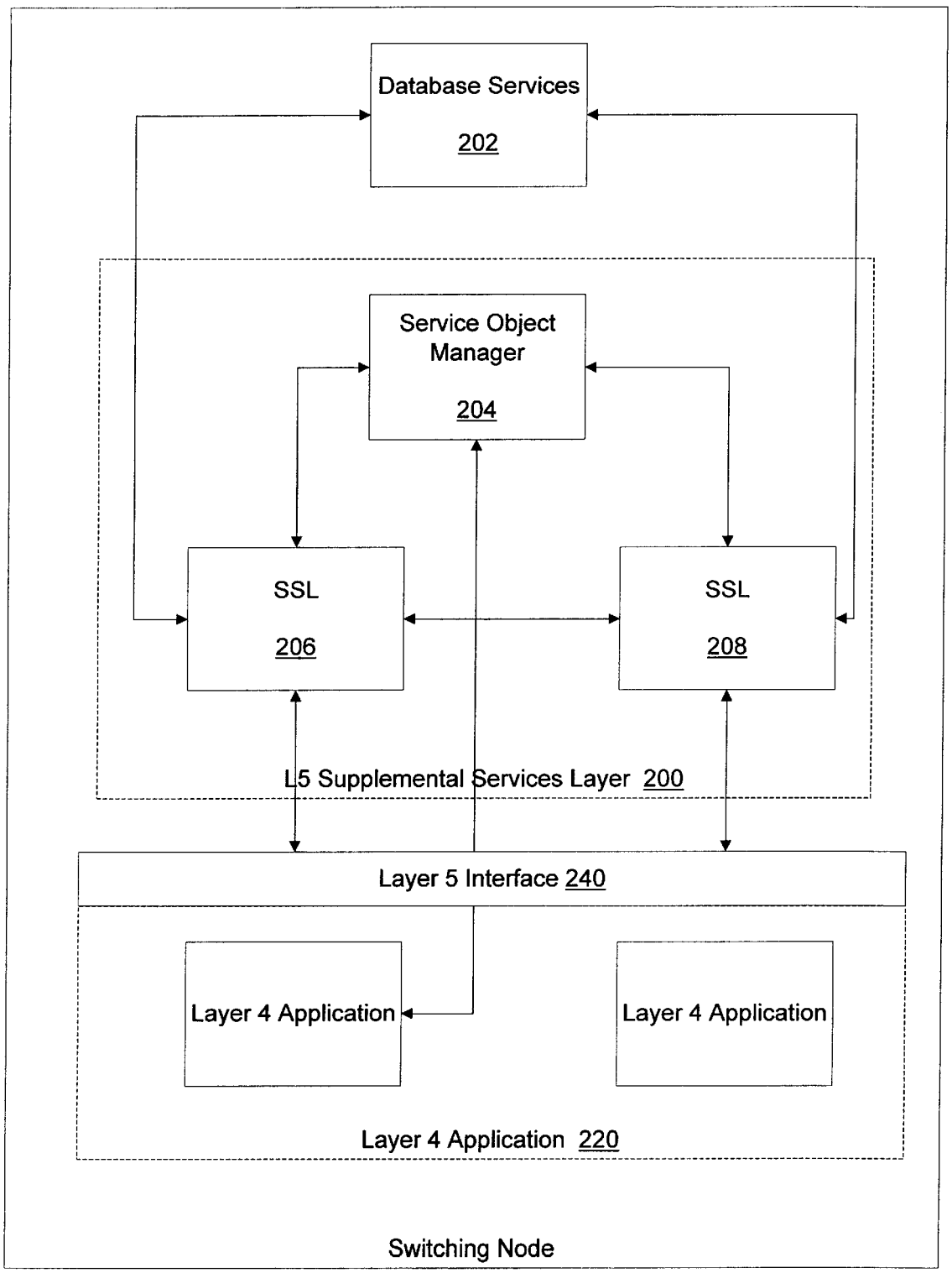
FIG. 2 is a schematic diagram of the SSL and how the objects interact with each other and with the L5 and L4 protocol applications.

The illustrative SSL 200 shown in FIG. 2 communicates with the L4 application 220 through the existing host-switch interfaces 240 in the switching nodes 32b–32f. The SSL 200 comprises a Database Interface Service 202, a Service Object Manager (SOM) 204 and one or more instances 206/208 of a Supplementary Service Object (SSO). The database interface service 202 provides connection to an external database (not shown) which stores each subscriber's service profile. Each SSO instance 206/208 performs the supplementary services needed during a call. The SOM 204 coordinates the activities of the SSO instances 206/208 and exercises overall control over these instances. Specifically it allocates, de-allocate, initializes and addresses each SSO instance 206/208.

Figure 3:
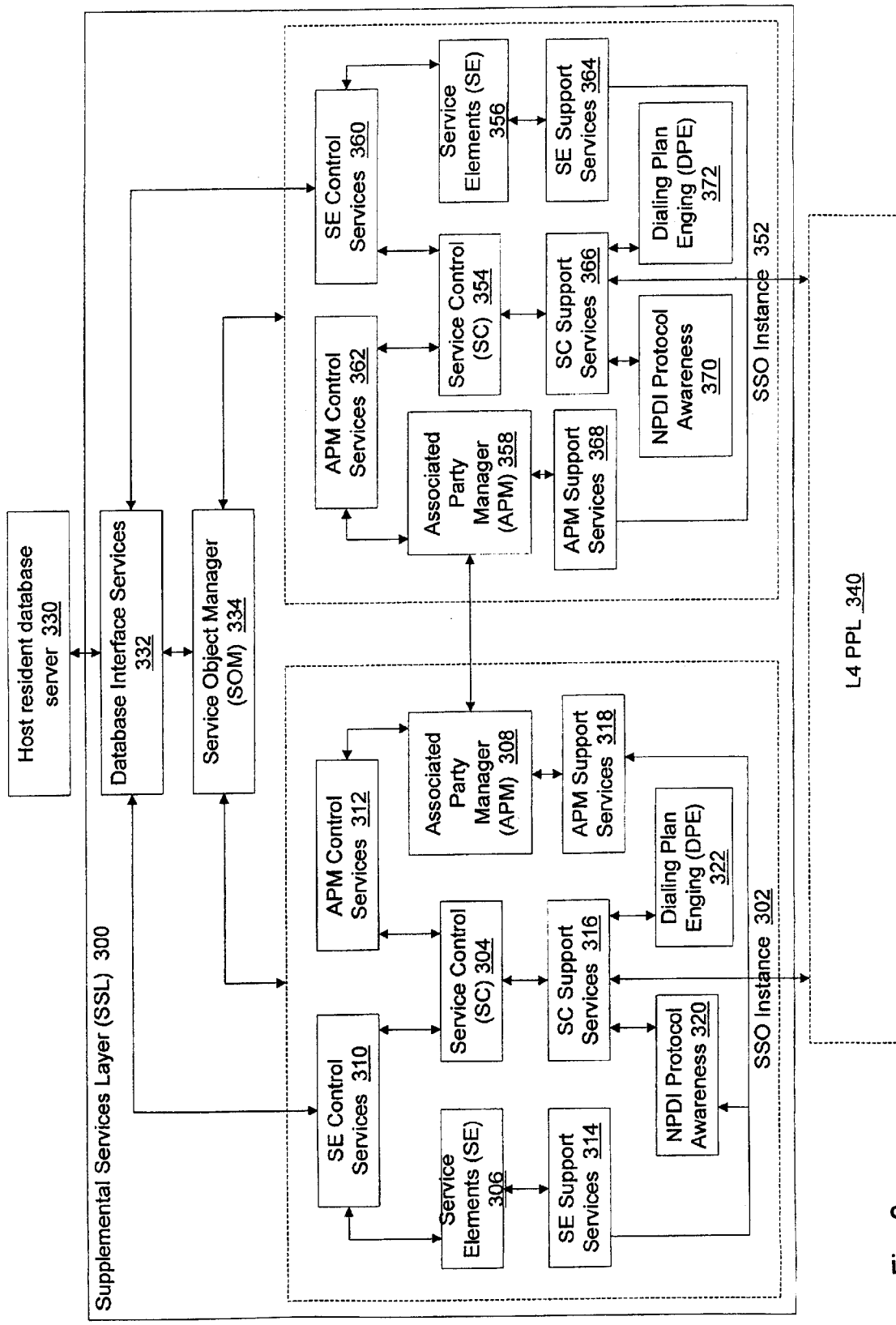
FIG. 3 is a depicts of two SSO instances and the interaction between these instances and other SSL objects.

FIG. 3 is a detailed diagram of two SSO instances 302/352. Each SSO instance comprises a Service Control object (SC) 304/354, one or more Service Element (SE) objects 306/356, an Associate Party Manager object (APM) 308/358, Support Services objects 314–318/364–368, and Control Services objects 310–312/360–362. The SC 304/354 activates each of the other SSO objects in its SSO instance 302/352 on a per-need basis. It also manages interactions between other SSO objects and determines the processing priority for these objects. The SC 304/354 is the only SSO object that interfaces with the L4 application 340 and it has access to all L4 services; thus, it services requests from other SSO objects to the L4 application.

Each instance of the SE 306/356 implements a single supplementary service for a call and it accesses a suite of standard support services 314/364 in order to implement the supplementary service. There may a number of different types of SEs 306/356 active for a single call. Each SE object implements a single supplementary service and the SE objects are loosely coupled through the SC. Each SE object defines an interface with the SC for instructing the SC on how to implement a supplementary service. An instance of the SE object is created when it is needed to perform a task and it is de-allocated when the task is completed. Specifically, even though an SE 306/356 instance is de-allocated, the call may still continue and other SE instances 306/356 may be instantiated to perform other supplementary services. The APM 308/358 serves as an interface object to other SSO instances 302/352. The instance of APM 308/358 that initiates a connection with another SSO instance is the "connection owner." The connection owner initiates and terminates communications with the L4 application 340 through its SC 304/454. Even though multiple APM instances 308/358 may be connected to the L4 application 340, the L4 application 340 can only communicate with one APM 308/358 at a time. The communicating APM 308/358 is the 'active' APM and all other APMs 308/358 connected to the L4 application 340 are 'held' APMs. APMs are dynamic and may be allocated/de-allocated as need arise.

The SCs 304/354, SEs 306/356, and APMs 308/358 each have support services 314–318/364–368. These support services 314–318/364–368 provide the functionality needed to perform each task. An example of a support service is a software object that provides access to external applications such as a Network Protocol Data Intelligence (NPDI) service 320 and 370 and a Dialing Plan Engine (DPE) Application 322 and 372. The NPDI service translates messages in different network signaling protocols. The DPE application applies network processing rules to each call. Network processing rules indicates how calls are processed. The SE 306/356 and APM 308/358 also have control services 310–312/360–362 that implement control models for allocating, de-allocating and addressing the SE 306/356 and APM 308/358 objects. Since multiple instances of the SE 306/356 and APM 308/358 may be active simultaneously, the control services 310–312/360–362 directly manage the SE 306/356 and APM 308/358 services. The control services 310–312/360–362 are accessed by the SC 304/354 in order for the SC 304/354 to manage the SE and APM 310–312 and 360–362 objects.

Figure 4:
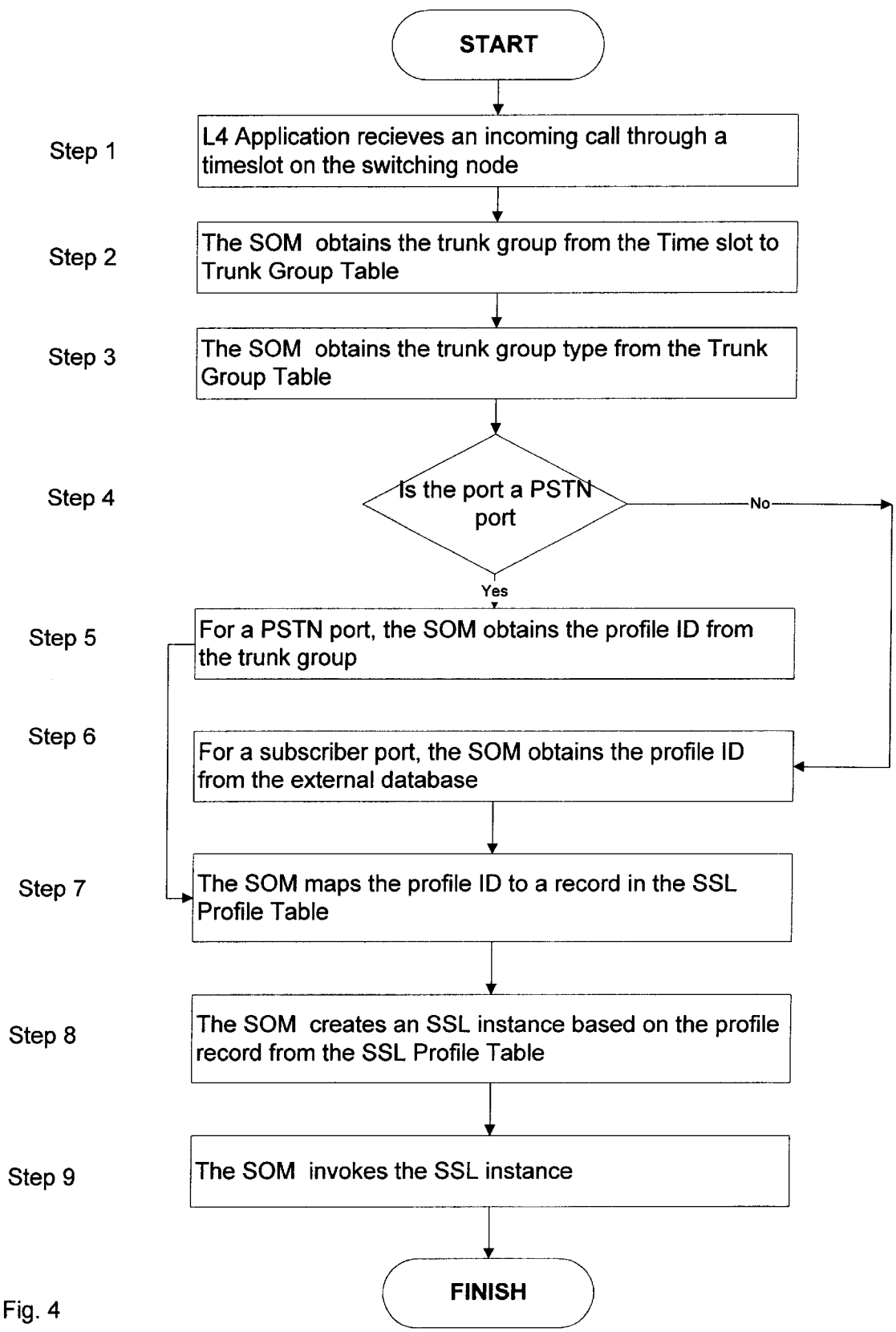
FIG. 4 shows the tables used by the SSL and the relationships between these tables.

FIG. 4 shows the SSL tables and the relationships between them. The L4 application receives calls through a port from the L3 application in a line card. The call is transmitted on two time slots in the switching node. One time slot is used for transmission from the L3 application to the L4 application, and the other time slot is used for retrieving switched data from the L4 application and sending it to the L3 application at another port. The time slots for each call are mapped to trunk groups by using a Time slot to Trunk Group Table 502. A trunk group is a collection of time slots/channels with similar properties. Once a trunk group identifier is obtained, a trunk group table 504 is used to obtain information about that trunk group's properties. For example, the trunk group table 504 includes a field that identifies whether associated ports are subscriber ports or PSTN ports. Based on the types of port, the SSL derives the calling and called parties' subscriber profiles, which identify the available supplementary services and ultimately defines which SSO objects may be executed.

For each PSTN trunk group, the trunk group table 504 contains profile identifiers common to all calls involving subscribers connected to that PSTN. The PSTN trunk group profile identifier is used by the SSL to obtain a record from a SSL Profile table 506. For subscribers connected to this system, the SSL obtains subscriber port profile identifiers from the external database and uses them to obtain individual records from the SSL Profile Table 506. Based on the records in the SSL Profile Table 506, the SSL creates the SSO instance and instantiates appropriate objects in the SSO instance.

Figure 5:
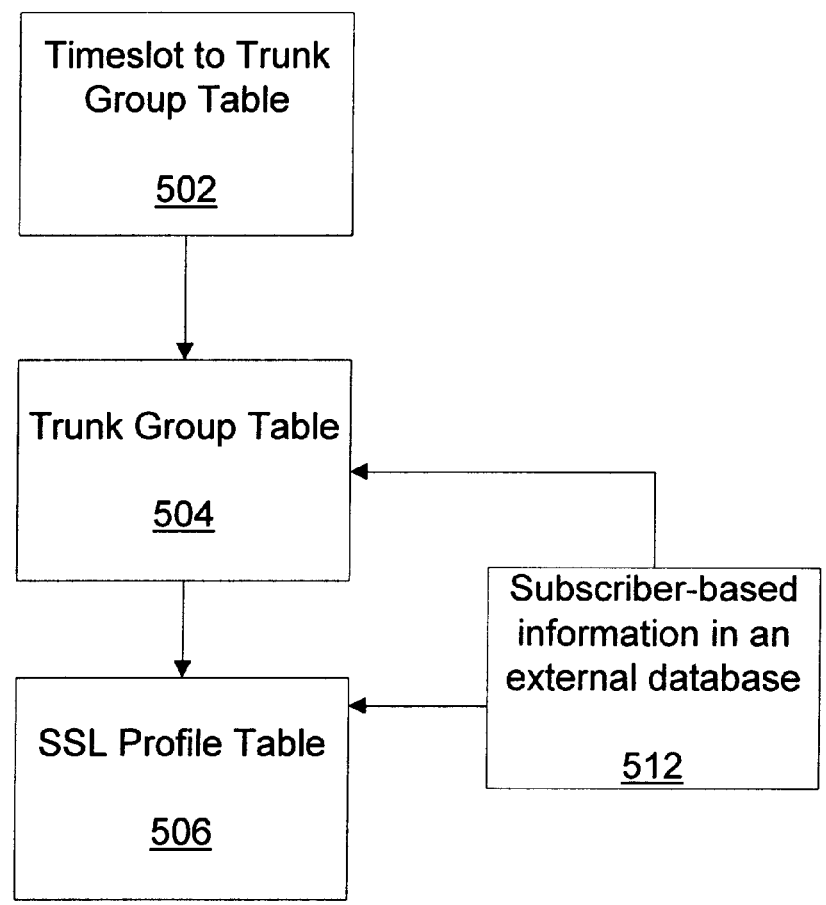
FIG. 5 is a flow diagram of how a incoming call is handled.

FIG. 5 is a flow diagram of an incoming call to a line card. At Step 1, the L4 application receives a call through a port from the L3 application in the line card. The L4 application transmits the call to the SSL, which must identify the trunk groups to which the ports belongs. In Step 2, the SOM maps the time slots to trunk groups by using the Time Slot To Trunk Group table. In Step 3, the SOM identifies the trunk group types from a Trunk Group Table. In Step 4, the SOM checks the trunk group types to determine whether the port is a PSTN port or a subscriber port. If the port is a PSTN port, the SOM obtains a profile ID from the trunk group in Step 5. If the port is a subscriber port, the SOM accesses the external database to obtain the profile ID in Step 6. In Step 7, the SOM maps the profile ID to a record in the SSL profile table. The record identifies which objects in the SSO instance must be activated. In Step 7, the SOM creates an SSO instance that matches the SSL profile table record. In Step 8, the SOM invokes the appropriate objects in the SSO instance.

Since the SSL is separated from the L5 application and each object in an SSO instance performs a specific task, when the processing requirements for the supplementary services change, the system operator only has to change the SSO object that is affected by the new processing requirements. For example, the system operator may modify a supplementary service by changing only the service element object that implements that service. Moreover, each time a new supplementary service is added, the system operation may only have to add the service element object that implements the supplementary service. Since the SE object for each supplemental service defines its interface with the SC object, the system operator may customized or introduce new supplementary services without software downloaded from the host and the risk of introducing processing errors that effects other areas in the L4 application is greatly reduced.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:
1. A switching system comprising:
  A) a plurality of switching nodes each of which contains:
    1. a programmable switch that includes a software protocol application that manages calls in that particular switching node, and that performs call-processing operations defined by a system operator;
    2. a plurality of line cards with ports for connections between the system and one or more external networks, said line cards including a line card software protocol application that manages calls in the line card, and that exchanges data between the switching system and one of said external networks; and
    3. a supplementary services application for the development and execution of supplementary services for each call processed in the switching system;
  B) an internodal switching network interconnecting each of the plurality of switching nodes for conveying switched telecommunications data between them;

C) a host computer that includes a software protocol application that manages calls in the host, and which host software protocol application exercises supervisory control over the plurality of switching nodes;

D) a host network linking the host computer and the switching nodes for supervisory and informational communications; and E) host-switch interface means for communicating and passing information between:
   1. the software protocol application that manages calls in a switching node, and the supplementary services application, and
   2. the host software protocol application, and the supplementary services application.

2. The switching system of claim 1 wherein the supplementary services application comprises:

A) a database interface service for connection to an external database which stores subscriber's profiles for each call processed in the switching system;

B) at least one instance of a supplementary service object for implementing supplementary services identified in the subscriber's profile; and C) a service object manager which exercises overall control over the supplementary service object instances.

3. The switching system of claim 2 wherein the line cards provide connections to subscribers and the external database stores a subscriber profile for each subscriber and each external network.

4. The switching system of claim 3 wherein each instance of the supplementary services object comprises:

A) at least one service element object which implements a supplementary service;

B) an associate party manager object which interfaces with other instances of the supplementary services object;

C) a service control object for managing other objects in the supplementary services object instance and serving as the interface between these objects and the software protocol application that manages calls in the switching nodes;

D) support services objects for providing the functions needed by the service element object, the associate party manager object, and the service control object to perform their respective tasks; and E) control services objects that implement control models for allocating, de-allocating and addressing the service element object and the associate party manager object.

5. The switching system of claim 4 wherein the supplementary services application further comprises:

A) a time slot table for associating time slots for a call with a trunk group;

B) a trunk group table for obtaining information about trunk group's properties;

C) a profile table for obtaining records with subscribers profiles; and

D) means for associating a record in the profile table with the trunk group.

6. The switching system of claim 5 wherein the trunk group table comprises profile identifiers for trunk groups associated with external networks, the profile identifiers are associated with records in the profile table.

7. The switching system of claim 6 wherein the supplementary services application creates and executes an instance of the supplementary service object that corresponds with the subscriber profile records.

8. The switching system of claim 7 wherein the supplementary services application and the host application communicate with the application that manages calls in the switching nodes through the same interface.

9. A method for developing and executing supplementary services in a switching system which comprises a plurality of switching nodes that each include a software protocol application for managing calls in that particular switching node, and line cards with associated ports, and a line card software protocol application for exchanging messages between the line cards of the switching system and external networks and/or subscribers served by the associated ports, an internodal network interconnecting the switching nodes, at least one host computer for running a supervisory software application, a host network linking each host computer with the switching nodes, a supplementary services application in each switching node, the supplementary services application implementing supplementary services for calls processed on the system, said method comprising the steps of:

A) transmitting a call from one of said associated ports through the line card software protocol application running on the line card with which that port is associated, to a software protocol application that manages calls in the switching node on a given switching node having the supplementary services application;

B) mapping time slots for the call to a trunk group by using a time slot table;

C) identifying the trunk group type by using a trunk group table;

D) obtaining a profile identifier for the trunk group;

E) associating the profile identifier with a profile record in a profile table; and F) creating and executing an instance of a supplementary service object that corresponds with that profile record.

10. The method of claim 9 wherein the step of identifying further comprises the step of checking the trunk group type to determine whether the port is a subscriber port.

11. The method of claim 10 wherein the step of obtaining comprises the steps of
   1. accessing an external database for the profile identifiers for trunk groups associated with subscriber ports, and
   2. retrieving the profile identifiers from the trunk group for ports associated with external networks.

12. A switching node, comprising:

(A) a programmable software protocol application for managing calls in the switching node, the software protocol application communicable with an associated host software protocol application running on an associated host device that exercises supervisory control over the switching node; and (B) a supplementary services application for the development and execution of supplementary services for calls processed in the switching node, including a supplementary services interface means for passing information between said supplementary services application and the software protocol application for managing calls in the switching node.

13. The switching node as defined in claim 12 further comprising,
   said programmable software protocol application for managing calls in the switching node including interface means for communicating with line card software protocol applications ruing on associated line cards for connections between the switching node and one or more external networks.

14. The switching node as defined in claim 12 wherein said supplementary services application further comprises, (A) at least one instance of a supplementary service object; and (B) a service object manager which exercises control over said supplementary service object.

15. The switching node as defined in claim 14 wherein each instance of the supplementary services object comprises:

at least one service element object which implements a supplementary service.

16. The switching node as defined in claim 14 wherein each instance of the supplementary services object comprises:

an associate party manager object which interfaces with other instances of the supplementary services object.

17. The switching node as defined in claim 14 wherein each instance of the supplementary services object comprises:

a service control object for managing other objects in the supplementary services object instance and serving as the interface between these objects and the application that manages calls in the switching node.

18. The switching node as defined in claim 14 wherein each instance of the supplementary services object comprises:

a support services object for providing the functions for any of the following: the service element object, an associate party manager object, and a service control object to perform their respective tasks.

19. The switching node as defined in claim 14 wherein each instance of the supplementary services object comprises:

a control services object that implements control models for allocating, de-allocating and addressing a service element object and an associate party manager object.

20. The switching node as defined in claim 12 wherein said supplementary services application further comprises:

a database interface service for connection to an external database which stores subscriber profiles for calls processed in the switching node, and at least one instance of a supplementary service object for implementing supplementary services identified in the subscriber's profile.

21. The switching node as defined in claim 12 wherein said supplementary services application and the host application communicate with the application that manages calls in the switching node through the same interface.

\* \* \* \* \*